United States Patent
Liao et al.

(10) Patent No.: US 9,749,075 B2
(45) Date of Patent: Aug. 29, 2017

(54) METHODS OF DISCOVERY AND MEASUREMENTS FOR SMALL CELLS IN OFDM/OFDMA SYSTEMS

(71) Applicant: MEDIATEK INC., Hsinchu (TW)

(72) Inventors: Pei-Kai Liao, Nantou County (TW); Hsiao-Lan Chiang, Miaoli County (TW); Chien-Chang Li, Penghu County (TW); Xiangyang Zhuang, Lake Zurich, IL (US)

(73) Assignee: MEDIATEK INC., Hsinchu (TW)

( * ) Notice: Subject to any disclaimer, the term of this patent is extended or adjusted under 35 U.S.C. 154(b) by 161 days.

(21) Appl. No.: 14/496,219

(22) Filed: Sep. 25, 2014

(65) Prior Publication Data
US 2015/0092582 A1 Apr. 2, 2015

Related U.S. Application Data

(60) Provisional application No. 61/883,336, filed on Sep. 27, 2013, provisional application No. 61/968,491, filed on Mar. 21, 2014.

(51) Int. Cl.
*H04J 11/00* (2006.01)
*H04L 5/00* (2006.01)
(Continued)

(52) U.S. Cl.
CPC ......... *H04J 11/005* (2013.01); *H04J 11/0079* (2013.01); *H04L 5/005* (2013.01);
(Continued)

(58) Field of Classification Search
None
See application file for complete search history.

(56) References Cited

U.S. PATENT DOCUMENTS

2010/0309797 A1* 12/2010 Lindoff .......... H04B 17/318
370/252
2011/0085465 A1* 4/2011 Lindoff .......... H04J 11/0069
370/252
(Continued)

FOREIGN PATENT DOCUMENTS

CN 103209426 A 7/2013
WO WO2013040487 A1 3/2013
(Continued)

OTHER PUBLICATIONS

International Search Report and Written Opinion of International Search Authority for PCT/CN2014/087542 dated Dec. 29, 2014 (11 pages).
(Continued)

*Primary Examiner* — Steven H Nguyen
(74) *Attorney, Agent, or Firm* — Imperium Patent Works; Zheng Jin; Darien Wallace

(57) ABSTRACT

A method of small cell discovery and RSRP/RSRQ measurements in OFDM/OFDMA systems is proposed. A discovery reference signal (DRS) with low transmission frequency is introduced to support small cell detection within a short time, multiple small cell discovery, and accurate measurement of multiple small cells. The DRS consists of one or multiple reference signal types with the functionalities including timing and frequency synchronization, cell detection, RSRP/RSSI/RSRQ measurements, and interference mitigation. RE muting is configured for the DRS to reduce interference level from data to DRS for discovery and RSRP/RSRQ measurements for small cells.

22 Claims, 10 Drawing Sheets

(51) Int. Cl.
  *H04L 27/26* (2006.01)
  *H04W 24/08* (2009.01)
  *H04W 48/10* (2009.01)
  *H04W 88/02* (2009.01)
  *H04W 48/16* (2009.01)

(52) U.S. Cl.
  CPC ........ *H04L 5/0007* (2013.01); *H04L 27/2613* (2013.01); *H04W 24/08* (2013.01); *H04W 48/10* (2013.01); *H04J 2011/0096* (2013.01); *H04L 5/0073* (2013.01); *H04W 48/16* (2013.01); *H04W 88/02* (2013.01)

(56) References Cited

U.S. PATENT DOCUMENTS

| | | | |
|---|---|---|---|
| 2011/0110254 A1* | 5/2011 | Ji | H04W 36/0066 370/252 |
| 2011/0164513 A1* | 7/2011 | Lecki | H04W 52/0245 370/252 |
| 2012/0046030 A1* | 2/2012 | Siomina | G01S 5/00 455/423 |
| 2012/0195286 A1 | 8/2012 | Kim et al. | 370/330 |
| 2012/0213109 A1 | 8/2012 | Xu et al. | 370/252 |
| 2012/0307922 A1* | 12/2012 | Simonsson | H04W 24/10 375/260 |
| 2013/0022096 A1* | 1/2013 | Kazmi | H04L 27/2602 375/224 |
| 2013/0196659 A1* | 8/2013 | Damji | H04W 52/0225 455/434 |
| 2013/0250782 A1 | 9/2013 | Nimbalker et al. | 370/252 |
| 2013/0294271 A1 | 11/2013 | Nagata et al. | 370/252 |
| 2014/0092758 A1* | 4/2014 | Suzuki | H04W 48/18 370/252 |
| 2014/0248886 A1* | 9/2014 | Yamazaki | H04W 52/244 455/443 |
| 2014/0348015 A1* | 11/2014 | Seo | H04W 24/10 370/252 |
| 2014/0349648 A1 | 11/2014 | Lin et al. | 455/436 |
| 2015/0358094 A1* | 12/2015 | Yi | H04B 17/318 370/252 |

FOREIGN PATENT DOCUMENTS

| | | |
|---|---|---|
| WO | WO2013089421 A1 | 6/2013 |
| WO | WO2013130052 A1 | 9/2013 |
| WO | WO2013142221 A1 | 9/2013 |

OTHER PUBLICATIONS

USPTO, Office Action for related U.S. Appl. No. 14/496,181 dated Apr. 26, 2016 (7 pages).

EPO, Search Report for the EP patent application 14849867.8 dated Oct. 13, 2016 (7 pages).

EPO, Search Report for the EP patent application 14849524.5 dated Oct. 13, 2016.

3GPP TSG-RAN WG1 #74 R1-133826, MediaTek Inc., Performance Evaluation for Small Cell Discovery Using Legacy Schemes, Barcelona, Spain dated Aug. 19-23, 2013 (5 pages).

3GPP TSG-RAN WG1 #74 R1-133836, MediaTek Inc., Performance Evaluation for Small Cell Discovery Using New Schemes Based on CRS, Barcelona, Spain dated Aug. 19-23, 2013 (5 pages).

* cited by examiner

FULL RE MUTING in 5th OFDM SYMBOL OF EACH SLOT

PARTIAL RE MUTING in 5th OFDM SYMBOL OF EACH SLOT

FULL RE MUTING in ALL OFDM SYMBOLS WHERE CRS EXISTS EXCEPT 1st OFDM SYMOL in 1st SLOT

PARTIAL RE MUTING in ALL OFDM SYMBOLS WHERE CRS EXISTS EXCEPT 1st OFDM SYMOL in 1st SLOT

PARTIAL RE MUTING in ALL OFDM SYMBOLS
WHERE PRS EXISTS

FULL RE MUTING in FOUR OF EIGHT OFDM SYMBOLS
WHERE PRS EXISTS

ZP CSI-RS on RES of POTENTIAL LOCATIONS for
PORT-15 CSI-RS plus CRS

ZP CSI-RS on RES of POTENTIAL LOCATIONS for
PORT-15 CSI-RS plus CRS and PSS

ZP CSI-RS on RES of POTENTIAL LOCATIONS for
PORT-15 CSI-RS plus CRS and TWO COPIES of PSS DRS with CRS and PSS/SSS, FULL RE MUTING in 5th OFDM
SYMBOL OF EACH SLOT ZP CSI-RS on RES of POTENTIAL LOCATIONS for
PORT-15 CSI-RS plus CRS and PSS/SSS

METHODS OF DISCOVERY AND MEASUREMENTS FOR SMALL CELLS IN OFDM/OFDMA SYSTEMS

CROSS REFERENCE TO RELATED APPLICATIONS

This application claims priority under 35 U.S.C. §119 from U.S. Provisional Application No. 61/883,336, entitled "Methods of Discovery and Measurements for Small Cells in OFDM/OFDMA Systems," filed on Sep. 27, 2013; U.S. Provisional Application No. 61/968,491, entitled "Methods of Discovery and Measurements for Small Cells in OFDM/OFDMA Systems," filed on Mar. 21, 2014, the subject matter of which is incorporated herein by reference.

TECHNICAL FIELD

The disclosed embodiments relate generally to OFDM/OFDMA systems, and, more particularly, to discovery and measurements for small cells in OFDM/OFDMA systems.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

In 3GPP Release-11 LTE system, time-domain muting scheme together with interference cancellation receiver techniques are utilized for inter-cell interference coordination/cancellation to enable the cell range extension of picocells for better mobile data offloading from macrocell in the heterogeneous networks (HetNet), where there are deployments of both macrocells and picocells sharing the same frequency band. In addition, coordinated multi-point (CoMP) operation is also enabled to provide more system throughput gain with more tightly cooperation among base stations in HetNet. For further improvement of system throughput, wide deployment of small cells in the mobile networks is viewed as a promising technology and feature in 3GPP Release 12 LTE system. Small cells generally include picocells, hotspot, femtocells, and microcells in licensed band and WiFi AP in unlicensed band.

Unlike macrocell with a coverage radius ranging from one to several kilometers, small cells are low-power radio access nodes that operate in either licensed or unlicensed spectrum with a coverage radius ranging from tens to hundreds of meters. With emerging needs for more system throughput due to the popularity of smart phones, many mobile network operators are eagerly looking for methods to enhance the utilization efficiency of available radio spectrum by either spectrum efficiency improvement in licensed band or mobile data offloading in unlicensed band. As a technology providing promising gain in radio spectrum utilization efficiency, deployment of small cells receives broad attention from mobile network operators in recent years and 3GPP is planning to enable small cell deployment in the next release of LTE system.

In 3GPP Release-12 LTE system, the techniques to enable the deployment of small cells in licensed band will be the focus in RAN working groups. Due to possible acquisition of 3.5 GHz frequency bands, it enables the possibility of non-cochannel deployments for small cells to relief interference issues between macrocells and small cells. As one of considered scenarios, the signaling overhead of mobility management and the time radio access interruption due to handover can be improved by assigning the frequency band for the deployment of macrocells as a mobility layer and the other frequency band for the deployment of small cells as a capacity layer. In addition to non-cochannel deployment, further enhancements on the inter-cell interference coordination/cancellation techniques are also considered and under evaluation for cochannel deployment.

With large number of small cell deployments, new techniques are needed to resolve possible issues in both protocol and physical layers, such as mobility management, inter-cell interference handling, on/off small cell operation, etc. In addition, how to enable smooth migration of legacy UEs with limited impact is also one of important issues. The technique for efficient small cell discovery is one of the techniques remain under evaluation and development.

To support small cell on/off operation for the mitigation of inter-cell interference due to cell-specific reference signals (CRS) and load shifting among small cells, discovery of multiple small cells within limited time is needed and discovery reference signal (DRS) was proposed in 3GPP to enable it. One of candidate solutions for discovery signal design is to reuse existing reference signal designs. However, they suffer from high inter-cell interference level or large reference signal overhead. In addition, timing/frequency synchronization offset between small cells also affects the performance of cell detection and measurement using some existing reference signal designs. Therefore, enhancements are needed to resolve aforementioned problems when existing reference signal design is reused for small cell discovery.

SUMMARY

A method of small cell discovery and RSRP/RSRQ measurements in OFDM/OFDMA systems is proposed. A discovery reference signal (DRS) with low transmission frequency is introduced to support small cell detection within a short time, multiple small cell discovery, and accurate measurement of multiple small cells. The DRS consists of one or multiple reference signal types with the functionalities including timing and frequency synchronization, cell detection, RSRP/RSSI/RSRQ measurements, and interference mitigation. RE muting is configured for the DRS to reduce interference level from data to DRS for discovery and RSRP/RSRQ measurements for small cells.

In a first novel aspect, a base station allocates a set of resource elements (REs) over multiple time-domain OFDM symbols in a set of time slots or subframes for transmitting a corresponding set of DRS from a plurality of small cells. The base station transmits configuration information to a plurality of user equipments (UEs). The configuration information comprises information on DRS duration, DRS periodicity, and RE muting patterns of the set of REs for the plurality of small cells. In one embodiment, the DRS comprises at least one of a cell-specific reference signal (CRS), a channel state information reference signal (CSI-RS), a positioning reference signal (PRS), and a synchronization signal (PSS/SSS).

In a second novel aspect, a base station transmits a set of discovery reference signal (DRS) on a corresponding set of resource elements (REs) over multiple time-domain OFDM symbols in a set of time slots or subframes. The base station obtains DRS configuration information including DRS duration, DRS periodicity, and RE muting patterns of the set of REs. The base station applies RE muting for data transmission on a first subset of the set of REs that are not used for DRS transmission. The base station applies full power data transmission on a second subset of REs. The RE muting patterns may be determined based on cell loading, and no RE muting is applied in control channels or when collide with other legacy reference signals. The RE muting patterns may be received from another base station, or determined based on PCI. In one embodiment, the first subset of REs belongs to a first subset of the multiple time-domain OFDM symbols, and the second subset of REs belongs to a second subset of the multiple time-domain OFDM symbols.

In a third novel aspect, a user equipment (UE) receives a set of discovery reference signals (DRS) on a corresponding set of resource elements (REs) over multiple time-domain OFDM symbols in a set of time slots. The UE obtains DRS configuration information. The UE performs synchronization and cell detection using a subset of DRS REs based on the configuration information. The UE performs measurements using another subset of DRS REs based on the configuration information. In one embodiment, the UE performs a first measurement on a first subset of time-domain OFDM symbols to obtain a first metric, and the UE performs a second measurement on a second subset of time domain OFDM symbols to obtain a second metric. The first metric is a Reference Signal Received Power (RSRP), and RE muting is applied on a subset of REs that are not used for DRS transmission in the first subset of time-domain OFDM symbols. The second metric is a Received Signal Strength Indicator (RSSI), and RE muting is not applied on REs in the second subset of time-domain OFDM symbols. In one embodiment, a DRS duration lasts one or more subframes, and the DRS is transmitted with a periodicity that is substantially longer than one radio frame. The UE performs synchronization, cell detection, and measurements within one single DRS duration.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1A:
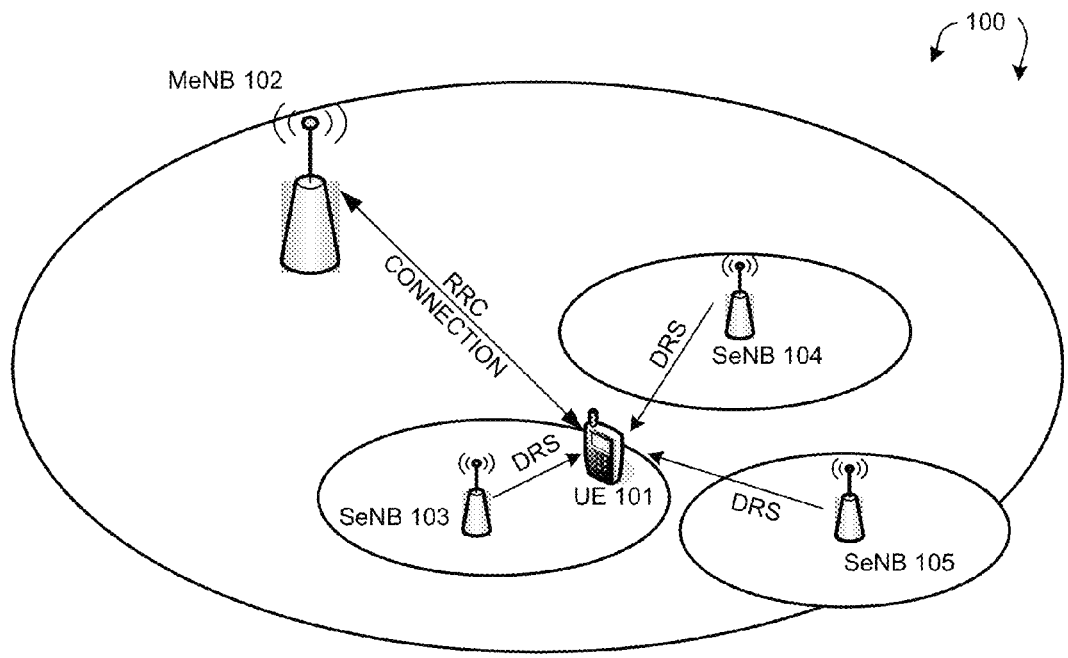
FIG. 1A illustrates a heterogeneous network deployed with both micro cell and small cell in accordance with one novel aspect.
Figure 1B:
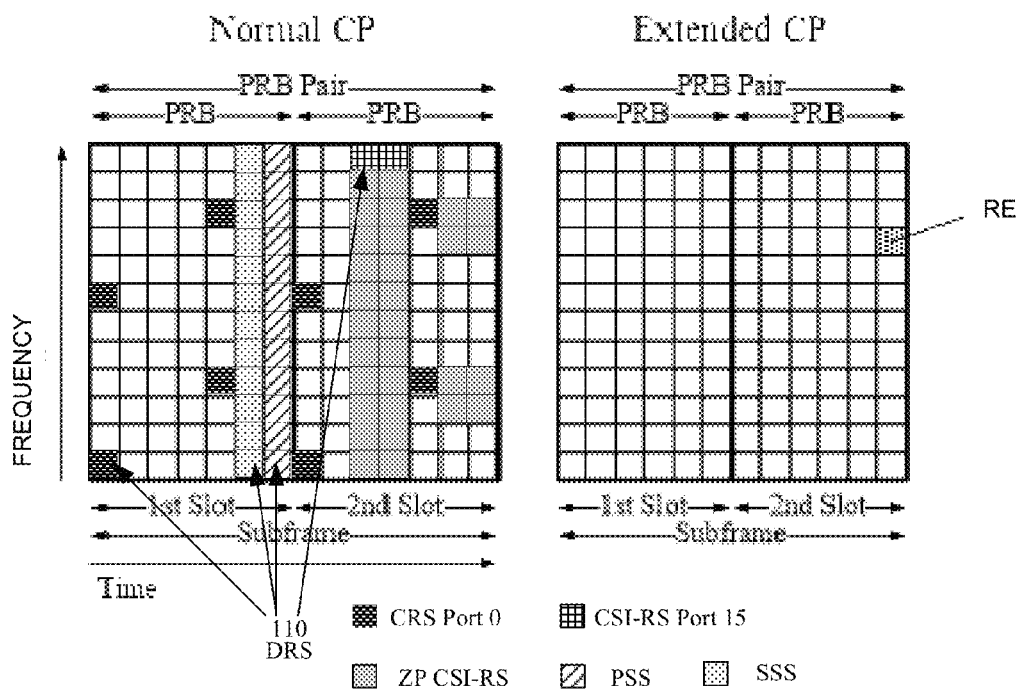
FIG. 1B illustrates two examples of subframe structure with normal and extended CP in 3GPP LTE systems based on OFDMA downlink.

FIG. 1A illustrates a heterogeneous network 100 deployed with both micro cell and small cell in accordance with one novel aspect. HetNet 100 is a 3GPP LTE mobile communication network comprising a user equipment UE 101, a macro base station MeNB 102, and a plurality of small base station SeNB 103, SeNB 104, and SeNB 105. In 3GPP LTE system based on OFDMA downlink, the radio resource is partitioned into radio frames, each of which consists of 10 subframes. Each subframe has a time length of 1 ms and is comprised of two slots and each slot has seven OFDMA symbols in the case of normal Cyclic Prefix (CP) and six OFDMA symbols in case of extended CP. Each OFDMA symbol further consists of a number of OFDMA subcarriers depending on the system bandwidth. The basic unit of the resource grid is called Resource Element (RE), which spans an OFDMA subcarrier over one OFDMA symbol. A physical resource block (PRB) consists of 12 subcarriers in frequency domain and 1 slot in time domain, which constitutes 84 REs in normal CP and 72 REs in extended CP. Two PRBs locating in the same frequency location spans in different slots within a subframe is called a PRB pair. FIG. 1B illustrates two examples of subframe structure for both normal and extended CP based on OFDMA downlink.

When an UE is turned on in a cell or handovers to a cell, it performs downlink synchronization and system information acquisition before conducting random access process to get RRC-layer connected. Downlink synchronization is performed by an UE with primary and secondary synchronization signals (PSS and SSS) to synchronize the carrier frequency and align OFDM symbol boundary between the base station of a cell and an UE. Further frequency and timing fine-tune or tracking is carried out continuously with cell-specific reference signal (CRS) by an UE. CRS is a kind of common pilots that are always transmitted in whole channel bandwidth in every subframe no matter whether there is data transmission. When there is data transmission, CRS is not pre-coded with a MIMO precoder even if MIMO precoding is applied so CRS can also be utilized for the coherent data demodulation when there is precoding information provided to an UE. In addition to CRS, UE-specific reference signals (DMRS), which are a kind of dedicated pilots, are also specified in Release 8/9/10/11 LTE systems. Compared to CRS, DMRS is only transmitted in the radio resources where there is data transmission and it is pre-coded with the same MIMO precoder together with the data tones for a specific UE if MIMO precoding is applied and it is mainly utilized for coherent data demodulation.

After an UE gets downlink synchronized, system information acquisition is the next step to obtain necessary information for random access and connection/service settings. For the best trade-off between transmission overhead and connection delay, system information is divided into several blocks in LTE system, each of which has different periodicities. Master information block (MIB) is one of system information blocks and contains information of downlink cell bandwidth, system frame number (SFN), physical HARQ indicator channel (PHICH) configuration and the number of transmit antenna ports. MIB is carried in physical broadcast channel (PBCH), which is transmitted every radio frame with a fixed periodicity of four radio frames. After obtaining MIB, UE is able to obtain system information block SIB1 and other SIBs for further system setting. SIB1 and other SIBs are carried in physical downlink shared channel (PDSCH), which is scheduled by downlink physical control channel (PDSCH). SIB1 is transmitted every second radio frame with a fixed periodicity of eight radio frames while other SIBs has variable periodicity configured in SIB1.

In small cell deployments, both hotspot and hotzone are possible scenarios. In LTE Release 12, hotzone scenario is the focus and both sparse and dense small cell deployments within a hotzone are considered for different traffic density requirements. For ubiquitous coverage, both indoor and outdoor small cell deployments are considered as well. Since user distribution may vary with time and places within a hotzone (e.g. more users in an office building during the day time and less users during the night time; higher user density in the stores on sale in a department), small cell on-off operation and load balancing among small cells may be required for network power efficiency, interference control and higher user throughput.

To support the discovery of a small cell which is in non-active state (i.e. a state with no or limited signal transmission) and the small cells which are not the small cell with strongest received signal strength for an user (e.g. small cells with $2^{nd}$, $3^{rd}$ or $4^{th}$ strongest received signal strength), a special reference signal, called discovery reference signal (DRS) may be needed. One of the main reasons to introduce non-active state to a small cell is to reduce the inter-cell interference between small cells due to the transmission of CRS when there is no data transmission. From the perspectives of inter-cell interference, it is preferred to introduce DRS with the much less transmission frequency than CRS. For the power efficiency of a user equipment (UE), it is also preferred to introduce DRS with which UE can discover a small cell in a short time. For the load balancing between small cells, it is preferred for the DRS to support the discovery and accurate measurements of multiple small cells. The measurements may include reference signal received power (RSRP), reference signal received quality (RSRQ), channel state information (CSI) and other new measurement metrics. Referring back to FIG. 1A, UE 101 first establishes a radio resource control (RRC) connection with MeNB 102 and receives configuration information related to DRS transmission for small cells. After obtaining the DRS configuration information, UE 101 is then able to perform small cell discovery and measurements based on the DRS transmitted from the SeNBs.

The overall objectives of DRS can be summarized as follows. First, DRS has low transmission frequency. Second, DRS supports the detection of small cell within a short time. Third, DRS supports the discovery of multiple small cells. Fourth, DRS supports accurate measurements of multiple small cells. A DRS can consist of one or multiple reference signal types, and each reference signal type served for one or multiple purposes. To minimize the impact on UE implementation, reusing or modifying existing reference signals is preferred for the design of DRS in small cell discovery. FIG. 1B illustrates one example of DRS 110 in a subframe with normal CP. DRS 110 comprises existing reference signals including PSS/SSS pilot pattern for synchronization, antenna-port-0 CRS pilot pattern for RSRQ measurement, and antenna-port-15 CSI-RS pilot pattern with RE muting for RSRP measurement.

Figure 2A:
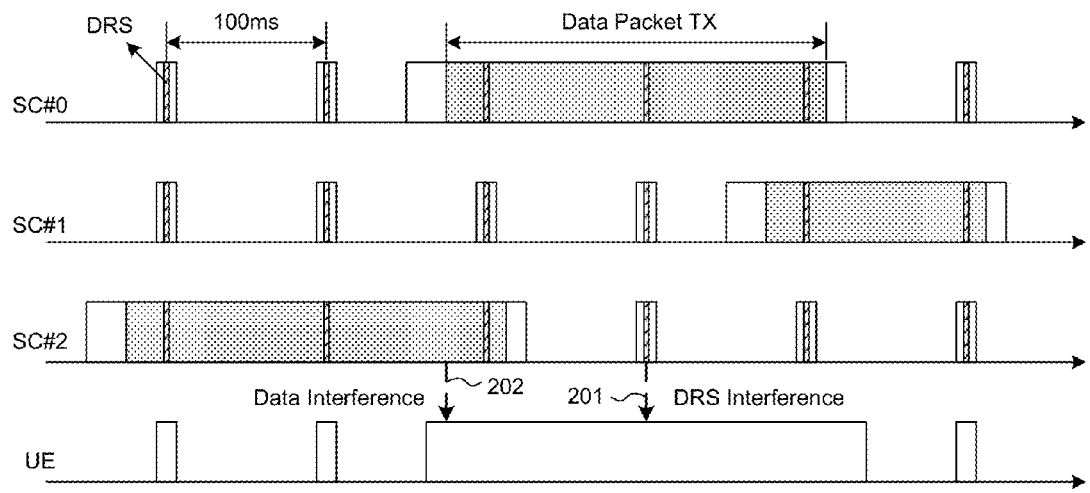
FIG. 2A illustrates small cell discovery using Discovery Reference Signal (DRS).

FIG. 2A illustrates small cell discovery using Discovery Reference Signal (DRS). Compared to reference signals for cell detection, RRM/CSI measurements and demodulation, the transmission periodicity of DRS can be much longer. As illustrated in FIG. 2A, DRS is transmitted with a periodicity of 100 ms in a synchronous way among different small cells SC#0, SC#1, and SC#2. With this design, the reference signal overhead, the interference introduced due to reference signals and the consumed UE power for both cell detection and UE measurements can be largely reduced.

However, since CRS is reused in DRS, the existing CRS scheme suffers from large inter-cell interference due to its frequency-reuse-one utilization. Though frequency-reuse-one utilization minimizes the overhead, it requires long-time averaging to achieve the requirements of measurement or detection accuracy. Without any alteration to CRS, it cannot fit the design considerations of DRS. It is observed that RSRP measurement performance improves when the average cell loading decreases. From FIG. 2A, it can be seen that CRS suffers from two types of interference—1) CRS interference from neighboring cells as depicted by arrow 201, and 2) Data interference from neighboring cells as depicted by arrow 202. With the technique of CRS interference cancellation, CRS interference from neighboring cells can be minimized and the only remaining interference is data interference from neighboring cells. Therefore, when the average cell loading in small cell layer decreases, data interference from neighboring small cells decreases as well and the RSRP measurement performance improves. Nevertheless, it is uncertain that average cell loading in small cell layer is always small to guarantee minimal data interference for accurate RSRP measurement.

In accordance with one novel aspect, RE muting technique is utilized to achieve the same effect artificially and the best trade-off between the overhead of RE muting and the data interference level suffered by CRS can be achieved by the network configuration based on the average cell loading in small cell layer. For example, when the average cell loading is high, more REs can be muted to guarantee the required performance for small cell discovery and measurements. When the average cell loading is low, fewer REs can be muted. The same technique can be applied when reusing positioning reference signal (PRS), and channel-state information reference signal (CSI-RS) as well. In current system, REs that are potential locations for PRS transmission within a time slot are all muted except those for actual PRS transmission in a cell. It is also possible to configure one or several subsets of REs that are potential locations for non-zero-power CSI-RS (NZP CSI-RS) transmission as zero-power CSI-RS (ZP CSI-RS) to provide orthogonal radio resources for NZP CSI-RS transmission among different cells.

Furthermore, received signal strength indicator (RSSI) is a kind of measurement to reflect the average cell loading on a carrier frequency and the measurement of RSSI needs to be carried out on the radio resources where all cells transmit signals. If RE muting is applied to mute the data interference from the neighboring cells to CRS, there is no way for UE to measure RSSI on CRS. The same situation happens for PRS and CSI-RS. Therefore, it is proposed to leave part of REs that can be used for DRS transmission unmuted and UE can measure RSSI on those unmuted REs.

Figure 2B:
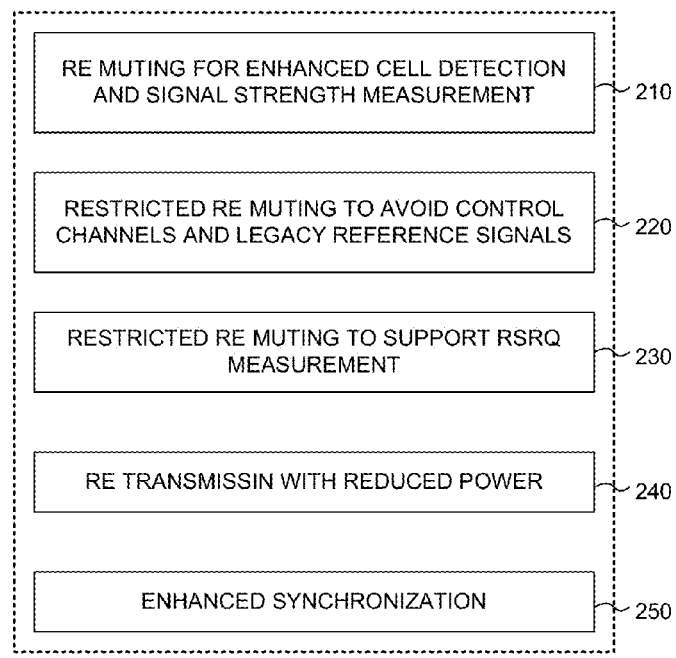
FIG. 2B illustrates different DRS design considerations with RE muting for enhanced cell discovery and measurements.

FIG. 2B illustrates various detailed DRS design considerations. First, RE muting is applied for enhanced cell detection and signal strength measurement, as depicted by box 210. To improve the performance of cell detection and signal strength (e.g. RSRP) measurement for UEs, REs that are potential locations for DRS transmission within a time slot and are not used for actual DRS transmission in a cell can be partially or all muted in the cell to control the interference level introduced to UEs served by other cells for DRS reception. The time slots for DRS transmission can be one or multiple subframes in 3GPP LTE system. The RE muting pattern can be configured to an UE for data reception by either higher-layer signaling from an eNB or by a predefined rule. The predefined rule can be based on the physical cell identification (PCI).

In one embodiment, RE muting patterns in different cells can be assigned through coordination so that DRS in different cells suffer zero interference due to the orthogonally created by RE muting patterns. If the RE muting pattern is configured to an UE by higher-layer signaling, the coordination is done through inter-eNB communication for dynamic or semi-static adaptation. If the RE muting pattern is configured to an UE based on PCI, the coordination is done through PCI assignments. In another embodiment, RE muting patterns in different cells can also be assigned without coordination. Each cell can pick its own RE muting pattern randomly based on a targeted interference level to other cells. After averaging, random RE muting patterns in different cells can thus provide an interference environment with the targeted interference level. For example, if current average cell loading is 50% and it requires the interference level introduced by 25% average cell loading to meet the performance requirements, 50% of REs that are potential locations for DRS transmission and are not used for DRS transmission can be randomly selected for muting in each cell. The RE muting pattern for DRS in a cell can vary based on the index of the time slot for time-domain hopping to randomize the introduced interference according to a predefined rule or higher-layer signaling.

Second, for minimized performance impact on legacy UEs, RE muting for reduced interference to DRS should be applied to data channel only, as depicted by box 220. No RE muting is applied in control channels, such as 0, PCFICH, PHICH and PDCCH in LTE system. This is because the additional RE muting may reduce the coding rate and degrade the decoding performance of these control channels for legacy UEs. For EPDCCH, RE muting can be applied and the introduced decoding performance impact is controlled by either applying MIMO beamforming transmission or utilizing PDCCH as a fallback mode. Even with restricted RE muting for control channels, the average interference level on DRS still can be reduced for the performance enhancement on cell detection and measurement. Whenever RE muting collides with legacy reference signals, no RE muting can be applied. To avoid the collision with legacy reference signals, DRS can be transmitted in subframes where there are no or limited legacy reference signals. For example, in 3GPP LTE system, DRS can be transmitted in MBSFN subframes to avoid the collision with CRS and PSS/SSS.

Third, RE muting is restricted to support RSRQ measurement, as depicted by box 230. For the measurement of total received power or received signal strength indicator (RSSI), RE muting is not preferred because RE muting artificially reduces the interference level due to data transmission. To support the measurement of total received power or received signal strength indicator (RSSI) in the time slots or OFDM symbols where DRS exists, part of REs which are potential locations for DRS transmission are further reserved and no RE muting is applied on them. Therefore, REs that are potential locations for DRS transmission are partitioned into two sets of REs. In the first set of REs, REs except those for DRS transmission can be partially or all muted for the measurement of reference signal received power or RSRP. The second set of REs are reserved for the measurement of total received power or received signal strength indicator (RSSI) and no RE muting is applied. RSRQ can be calculated based on the measured RSSI and RSRP using DRS. The partition of two sets of REs can be determined at UE side based on a predefined rule or higher-layer signaling. Alternatively, RSSI can be measured based on the partial muted REs. After the measurement, the receiver can multiply the measured RSSI with the ratio of muting. For example, if 50% of RE is muted, the RSSI can be time by two in the receiver site. The accuracy may be degraded, but it is a simpler way than partitioning RE into two sections. The ratio of muted RE can be transmitted to receiver site via higher-layer signaling.

Fourth, RE muting can be extended to RE transmission with reduced power, as depicted by box 240. To minimize the impact to legacy UEs and reduce introduced overhead, REs that are potential locations for DRS transmission and are not used for DRS transmission in a cell can be used for data transmission with reduced power in the cell to achieve reduced interference level introduced to UEs served by other cells for DRS reception. For example, if current average cell loading is 50% and it requires the interference level introduced by 25% average cell loading to meet the performance requirements, REs that are potential locations for DRS transmission and are not used for DRS transmission can be used for data transmission with 50% power reduction in each cell. Furthermore, for the measurement of total received power or received signal strength indicator (RSSI), part of REs that are potential locations for DRS transmission can be reserved and no transmission power reduction is applied on them.

Finally, enhanced synchronization can be achieved via DRS, as depicted by box 250. For small cells with the coverage of macro cells, there is high likelihood for small cells to achieve time and frequency synchronization with an offset value within a small range (e.g., ±3 µs in time and ±0.1 ppm in frequency) and no additional enhancements on synchronization for discover reference signal design. However, for small cells without the coverage of macrocells, there may be large time and frequency synchronization offset between small cells and enhancements on synchronization for discovery reference signal design may be needed. One simple solution to enhance the robustness of time and frequency synchronization is to utilize existing synchronization signals. To minimize the introduced overhead and inter-cell interference, the transmission periodicity of synchronization signals can be increased, e.g. 50 ms, 100 ms, or the same as that of discovery reference signal.

For UE power saving, the transmission of synchronization signals can be in the neighboring time slots to or the same time slot as that where the discovery reference signal is transmitted and small cells within a localized area can have synchronous transmission time for synchronization signals. For inter-cell interference coordination, small cells within a localized area can also have different transmission time for synchronization signals. The transmission time and periodicity of synchronization signals can be based on either a predefined rule or higher-layer signaling. Whether to transmit synchronization signals in small cells can be decided by the network and signaled to UEs through higher-layer signaling from the serving cell. In addition, multiple copies of the synchronization signal can be transmitted within a period of time, such that the receiver can average the synchronization results to get better timing/frequency estimation. The transmission time and periodicity of synchronization signals can be based on either a predefined rule or higher-layer signaling.

Figure 3A:
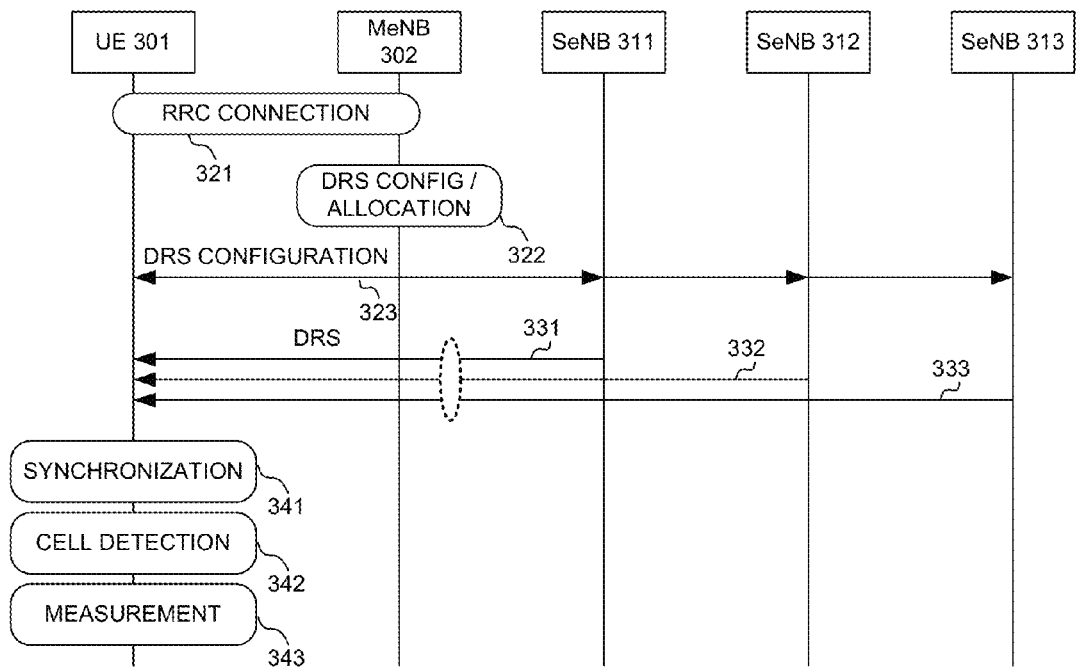
FIG. 3A illustrates a user equipment (UE) performing synchronization, cell detection, and measurement for small cells.

FIG. 3A illustrates a user equipment UE 301 performing synchronization, cell detection, and measurement for small cells. UE 301 is located in a heterogeneous network with macro base station MeNB 302 and a plurality small base station SeNB 311, SeNB 312, and SeNB 313. In step 321, UE 301 performs network entry and establishes an RRC connection with MeNB 302. In step 322, MeNB 302 allocates a set of resource elements (REs) for DRS transmission for a plurality of small cells served by the SeNBs. For example, MeNB 302 determines DRS related parameters including DRS duration and DRS periodicity and assigns RE muting patterns through coordinating among the small cells. In step 323, MeNB 302 transmits DRC related configuration information to UE 301. MeNB 302 also communicates the information to the SeNBs via Xn Interface. In step 331 to step 333, the SeNBs transmits a set of DRS to UE 301 according to the DRS parameters. In step 341, UE 301 performs synchronization with one or more of the small cells by detecting the corresponding synchronization signals in the received DRS. In step 342, UE 301 performs cell detection. Synchronization and cell detection are usually performed jointly. For example, the small cells nearby are assumed to be synchronized. UE 301 can first synchronize with the small cell with the strongest signal strength by detecting PSS sequence. Sequence detection is performed by using SSS and sequence detection results of PSS and SSS are combined to obtain Physical Cell ID (PCI). Further synchronization can be performed by using the detected SSS sequence. In addition, the UE can perform fine synchronization using CRS and/or CSI-RS with its serving cell. For example, if different transmission points (TP) use different PCI, then CRS is sufficient. If multiple transmission points share the same PCI, CRS is insufficient and CSI-RS should be used for synchronization additionally. In step 343, UE 301 performs small cell measurements based on the corresponding reference signals in the received DRS. Because DRS comprises multiple reference signals, it enables the UE to perform synchronization, cell detection, and measurements during the same DRS cycle.

UE measurements on DRS include SINR measurements and RSRP/RSRQ measurements. The following equation (1) illustrates the calculation of the signal to interference plus noise ratio SINR based on measurements and cell loading information:

$$SINR = \frac{S_i}{\alpha \times R - RU_i \times S_i} \quad (1)$$

where
$S_i$ is the measured received signal strength (RSRP) of the target cell i on DRS,
R is the total received power or RSSI on the selected REs,
$RU_i$ is the average cell loading of the cell i and can be signaled from the network to the UE.
α is the normalization factor depending on the number of REs used for the measurements of R and $S_i$.

The main difference between RSRQ and SINR measurement is that the denominator of SINR does not include the received signal strength of a target cell. SINR measurement thus requires accurate estimation of interference from other cells and white noise. For the numerator of SINR measurement for the target cell, UE can utilize REs for DRS transmission of the target cell within the set of REs which are able to be muted or transmitted with reduced power and are determined based on a predefined rule or higher-layer signaling to measure the reference signal received power or RSRP. For the denominator of SINR measurement for the target cell, UE can utilize the set of REs which are potential locations for DRS transmission and are restricted from muting and are determined based on a predefined rule or higher-layer signaling to measure total received power on those REs or RSSI and then subtract the product of the measured reference signal received power or RSRP and the average cell loading of the targeted cell from the measured RSSI with certain normalization. The cell loading information can be obtained from the broadcasted messages from one or multiple eNBs or from obtained from UE's own estimation.

RSRP is defined as the linear average over the power contributions of the REs that carry reference signal within the considered measurement frequency bandwidth. In the multi-cell system, the signals received by the UE in the REs that carry reference signals suffer from two types of interference—1) Data interference from neighboring cells; 2) reference signal interference from neighboring cells. The performance degradation of RSRP measurement is dominated by these two types of interference. To achieve a better performance of RSRP measurement, data interference from neighboring cells can be reduced by applying (partial) RE muting technique at the transmitter (from the eNB side) and interference of reference signal interference from neighboring cells can be suppressed at the receiver (from the UE side) using DRS interference cancellation techniques. To further reduce the reference signal interference from neighboring cells, UE can measure RSRP in the OFDM symbols that contain reference signal type of large frequency reuse rate.

RSRQ is defined as the ratio (N×RSRP)/RSSI, where N is the number of RBs of the measurement bandwidth and RSSI comprises the linear average of the total receive power in the OFDM symbols containing reference signals. According to the definition of RSSI and RSRQ, the larger the frequency reuse rate of the reference signal is, the larger the range of RSRQ value is. For extreme case, RSRQ will be infinity if the frequency reuse rate is infinity and cell loading is zero. From the perspective of UE, large range of RSRQ value would cause the difficulty in quantization. To minimize the impact to UE, RSSI is measured in the OFDM symbols that contain reference signal type of small frequency reuse rate. In this invention, both reference signal types can be combined into a DRS for RSRP/RSRQ measurement. Note that the RSSI is the total received power over a wideband for measurements, comparing to RSRP, which is the received power of the desired signal over a desired band.

Figure 3B:
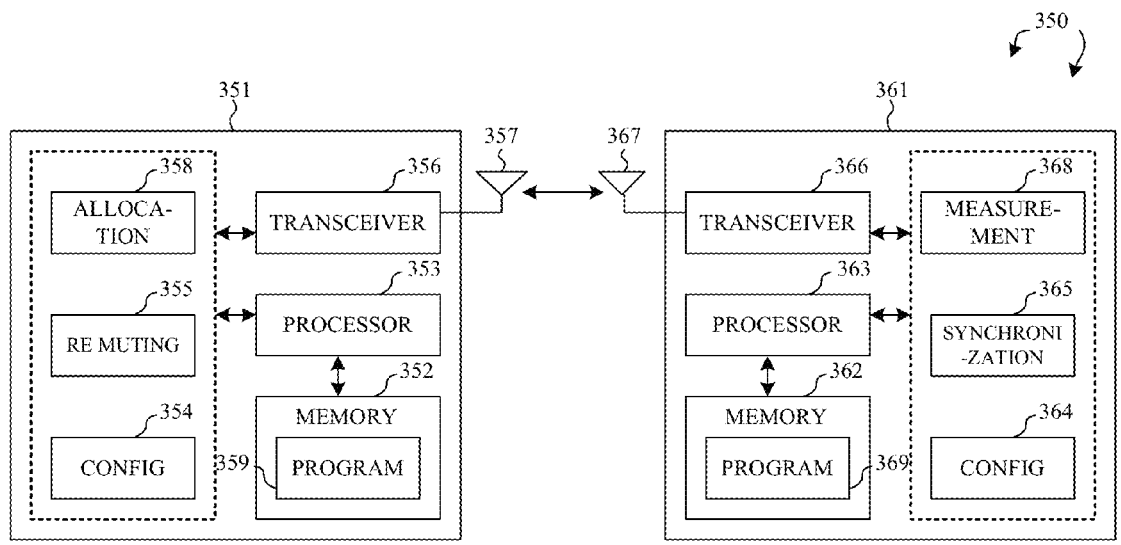
FIG. 3B illustrates simplified block diagrams of a base station and a user equipment in accordance with embodiments of the present invention.

FIG. 3B illustrates simplified block diagrams of a base station eNB 351 and a user equipment UE 361 in accordance with embodiments of the present invention. For base station 351, antenna 357 transmits and receives radio signals. RF transceiver module 356, coupled with the antenna, receives RF signals from the antenna, converts them to baseband signals and sends them to processor 353. RF transceiver 356 also converts received baseband signals from the processor, converts them to RF signals, and sends out to antenna 357. Processor 353 processes the received baseband signals and invokes different functional modules to perform features in base station 351. Memory 352 stores program code instructions and data 359 to control the operations of the base station. Similar configuration exists in UE 361 where antenna 367 transmits and receives RF signals. RF transceiver module 366, coupled with the antenna, receives RF signals from the antenna, converts them to baseband signals and sends them to processor 363. The RF transceiver 366 also converts received baseband signals from the processor, converts them to RF signals, and sends out to antenna 367. Processor 363 processes the received baseband signals and invokes different functional modules to perform features in UE 361. Memory 362 stores program code instructions and data 369 to control the operations of the UE.

Base station 351 and UE 361 also include several functional modules to carry out some embodiments of the present invention. The different functional modules can be implemented by software, firmware, hardware, or any combination thereof. The function modules, when executed by the processors 353 and 363 (e.g., via executing program codes 359 and 369), for example, allow base station 351 to configure and transmit DRS to UE 361, and allow UE 361 to receive DRS and performs synchronization, cell detection, and measurements accordingly. In one example, base station 351 allocates a set of radio resource for DRS transmission via allocation module 358 and assigns RE muting patterns via RE muting module 355. The DRS related configuration information is then transmitted via configuration module 354. UE 361 receives the DRS configuration information via configuration module 364. UE 361 performs synchronization via synchronization module 365 and performs measurements via measurement module 368.

Figure 4:
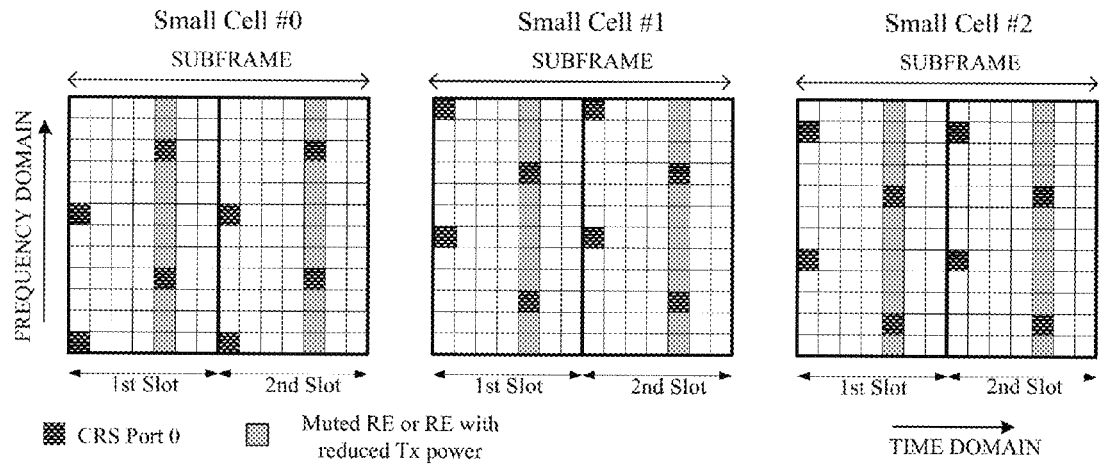
FIG. 4 illustrates a first embodiment of DRS design for small cell discovery and measurement.

FIG. 4 illustrates a first embodiment of DRS design for small cell discovery and measurement. In the embodiment of FIG. 4, antenna-port-0 CRS pilot pattern in LTE system is reused for DRS transmission, and RE muting can be applied to REs that are potential locations for CRS transmission and are not used for CRS transmission. To support both RSRP and RSRQ measurements in one subframe, REs except those for CRS transmission in a subset of OFDM symbols where CRS exists are all muted to eliminate the data interference to CRS or transmitted with reduced power. In FIG. 4, the first OFDM symbol of each slot are excluded from RE muting and REs except those for actual CRS transmission in the $5^{th}$ OFDM symbol of each slot are all muted to avoid possible collision between data RE and CRS in different cells. In this example, RSRP measurement can be conducted on CRS in the $5^{th}$ OFDM symbol of each slot, and RSSI measurement can be conducted on the first OFDM symbol of each slot for RSRQ calculation.

Figure 5:
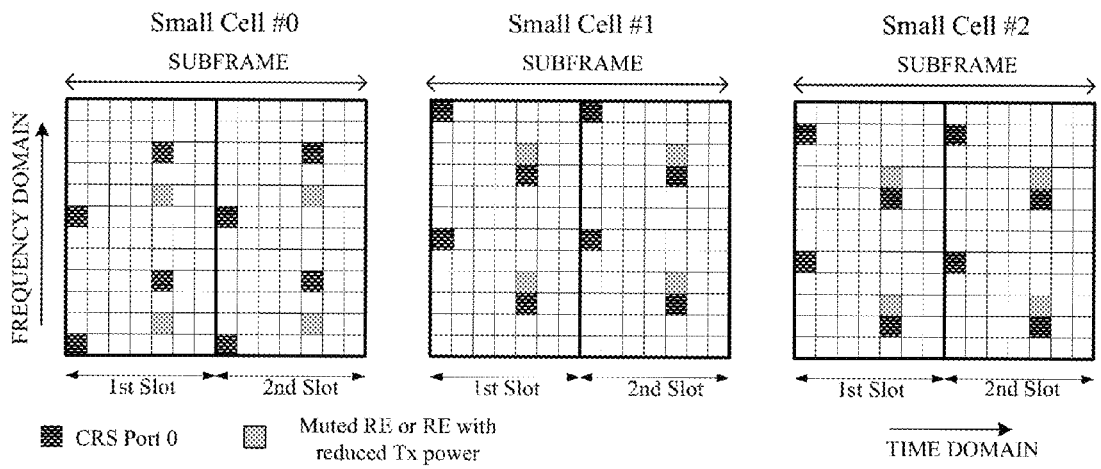
FIG. 5 illustrates a second embodiment of DRS design for small cell discovery and measurement.

FIG. 5 illustrates a second embodiment of DRS design for small cell discovery and measurement. In the embodiment of FIG. 5, antenna-port-0 CRS pilot pattern in LTE system is reused for DRS transmission and RE muting can be applied to REs that are potential locations for CRS transmission and are not used for CRS transmission. To support both RSRP and RSRQ measurements in one subframe, REs except those for CRS transmission in a subset of OFDM symbols where CRS exists are partially muted or transmitted with reduced power to reduce the data interference to CRS. In FIG. 5, the first OFDM symbol of each slot are excluded from RE muting and REs except those for actual CRS transmission in the $5^{th}$ OFDM symbol of each slot are partially muted to reduce the average interference level suffered by CRS by 50%. In this example, RSRP measurement can be conducted on CRS in the $5^{th}$ OFDM symbol of each slot and RSSI measurement can be conducted on the first OFDM symbol of each slot for RSRQ calculation.

Figure 6:
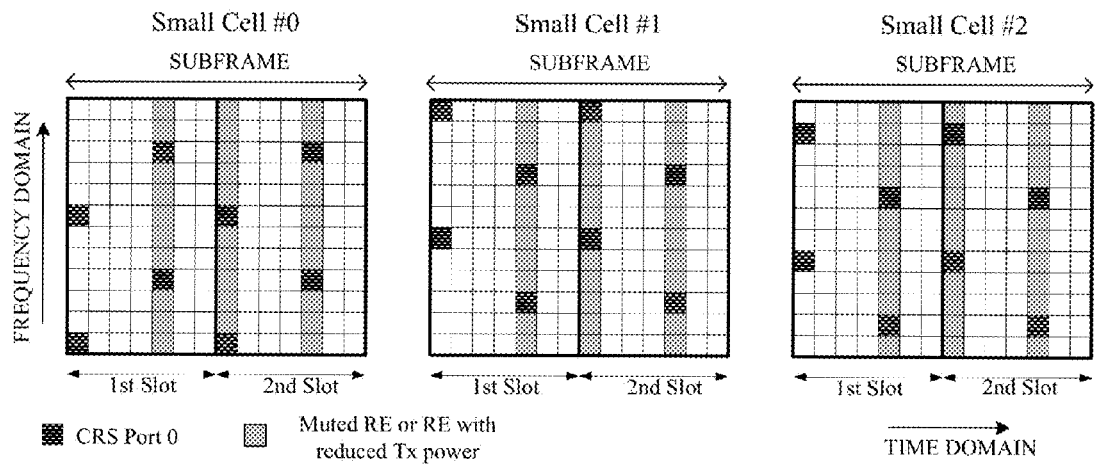
FIG. 6 illustrates a third embodiment of DRS design for small cell discovery and measurement.

FIG. 6 illustrates a third embodiment of DRS design for small cell discovery and measurement. In the embodiment of FIG. 6, antenna-port-0 CRS pilot pattern in LTE system is reused for DRS transmission and RE muting can be applied to REs that are potential locations for CRS transmission and are not used for CRS transmission. In addition to RE muting, reduced transmission power can also be applied to REs that are potential locations for CRS transmission and are not used for CRS transmission. To minimize the impact on legacy UEs, no RE muting or reduced transmission power is applied in the $1^{st}$ OFDM symbol of the $1^{st}$ slot. In FIG. 6, the first OFDM symbol of the $1^{st}$ slot are excluded from RE muting to avoid the performance impact on legacy control region and REs except those for actual CRS transmission in the remaining 3 OFDM symbols where there are potential CRS transmission are all muted to avoid possible collision between data RE and CRS in different cells.

Figure 7:
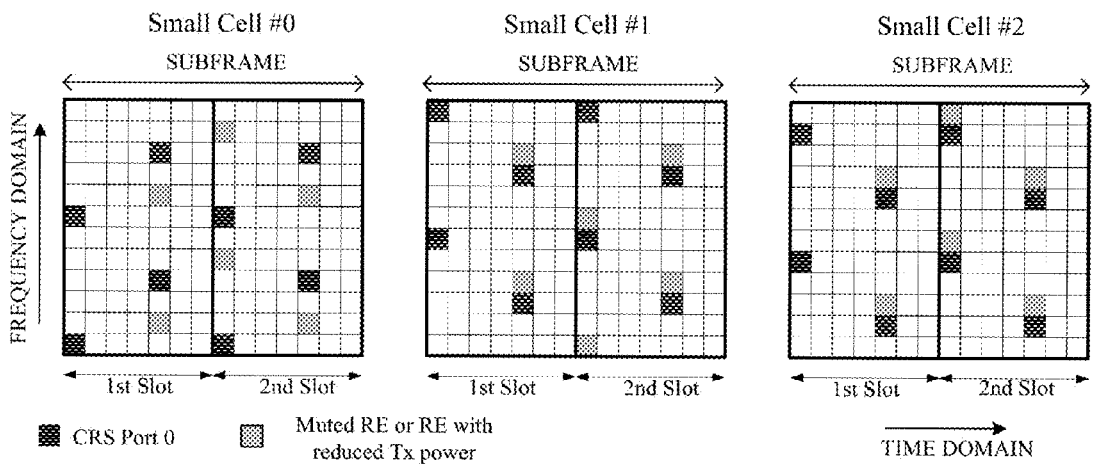
FIG. 7 illustrates a fourth embodiment of DRS design for small cell discovery and measurement.

FIG. 7 illustrates a fourth embodiment of DRS design for small cell discovery and measurement. In the embodiment of FIG. 7, antenna-port-0 CRS pilot pattern in LTE system is reused for DRS transmission and RE muting can be applied to a subset of REs that are potential locations for CRS transmission and are not used for CRS transmission. In addition to RE muting, reduced transmission power can also be applied to a subset of REs that are potential locations for CRS transmission and are not used for CRS transmission. To minimize the impact on legacy UEs, no RE muting or reduced transmission power is applied in the $1^{st}$ OFDM symbol of the $1^{st}$ slot. In FIG. 7, the first OFDM symbol of the $1^{st}$ slot are excluded from RE muting to avoid the performance impact on legacy control region and REs except those for actual CRS transmission in the remaining 3 OFDM symbols where there are potential CRS transmission are partially muted to reduce the average interference level suffered by CRS by 50%.

Figure 8:
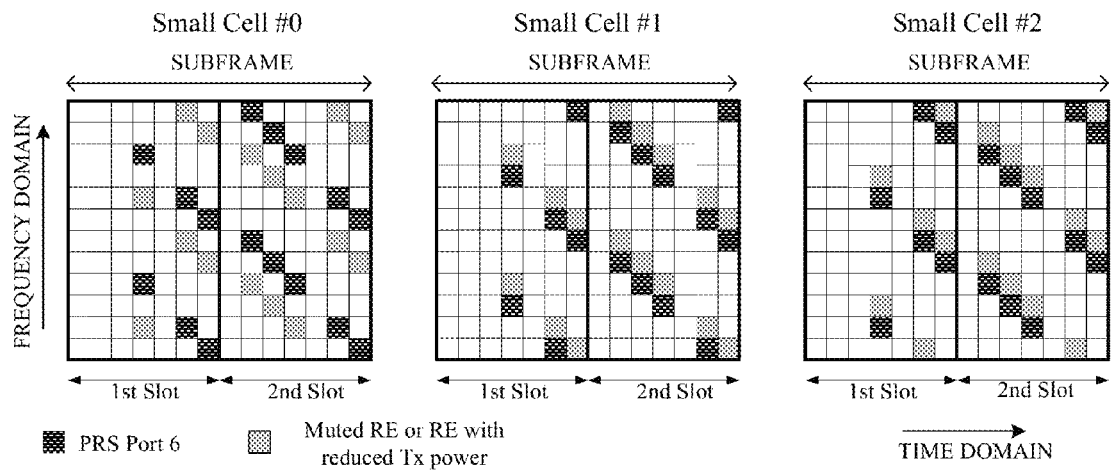
FIG. 8 illustrates a fifth embodiment of DRS design for small cell discovery and measurement.

FIG. 8 illustrates a fifth embodiment of DRS design for small cell discovery and measurement. In the embodiment of FIG. 8, antenna-port-6 PRS pilot pattern in LTE system is reused for DRS transmission and RE muting can be applied to a subset of REs that are potential locations for PRS transmission and are not used for PRS transmission. In addition to RE muting, reduced transmission power can also be applied to a subset of REs that are potential locations for PRS transmission and are not used for CRS transmission. In FIG. 8, REs except those for actual PRS transmission in the OFDM symbols where there are potential PRS transmission are partially muted to reduce the average interference level suffered by PRS by 50%.

Figure 9:
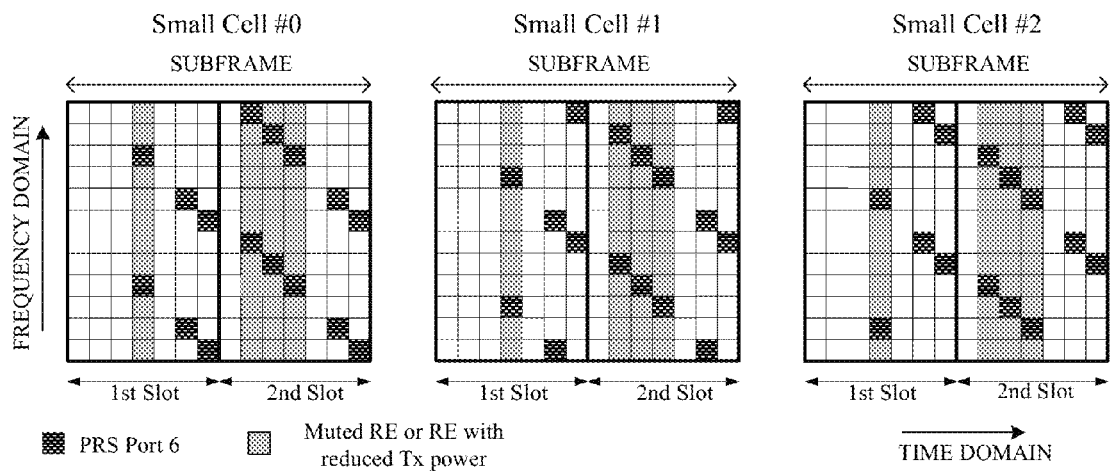
FIG. 9 illustrates a sixth embodiment of DRS design for small cell discovery and measurement.

FIG. 9 illustrates a sixth embodiment of DRS design for small cell discovery and measurement. In the embodiment of FIG. 9, antenna-port-6 PRS pilot pattern in LTE system is reused for DRS transmission and RE muting can be applied to REs that are potential locations for PRS transmission and are not used for PRS transmission. To support both RSRP and RSRQ measurements in one subframe, REs except those for PRS transmission in a subset of OFDM symbols where PRS exists are all muted to eliminate the data interference to PRS or transmitted with reduced power. In FIG. 9, the last two OFDM symbols of each slot are excluded from RE muting and REs except those for actual PRS transmission in the remaining OFDM symbols where there are potential PRS transmission are all muted to avoid possible collision between data RE and PRS in different cells. In this example, RSRP measurement can be conducted on PRS in the $4^{th}$ OFDM symbol of the $1^{st}$ slot and $2^{nd}$, $3^{rd}$, $4^{th}$ OFDM symbols of the $2^{nd}$ slot and RSSI measurement can be conducted on the last two OFDM symbols of each slot for RSRQ calculation.

Figure 10:
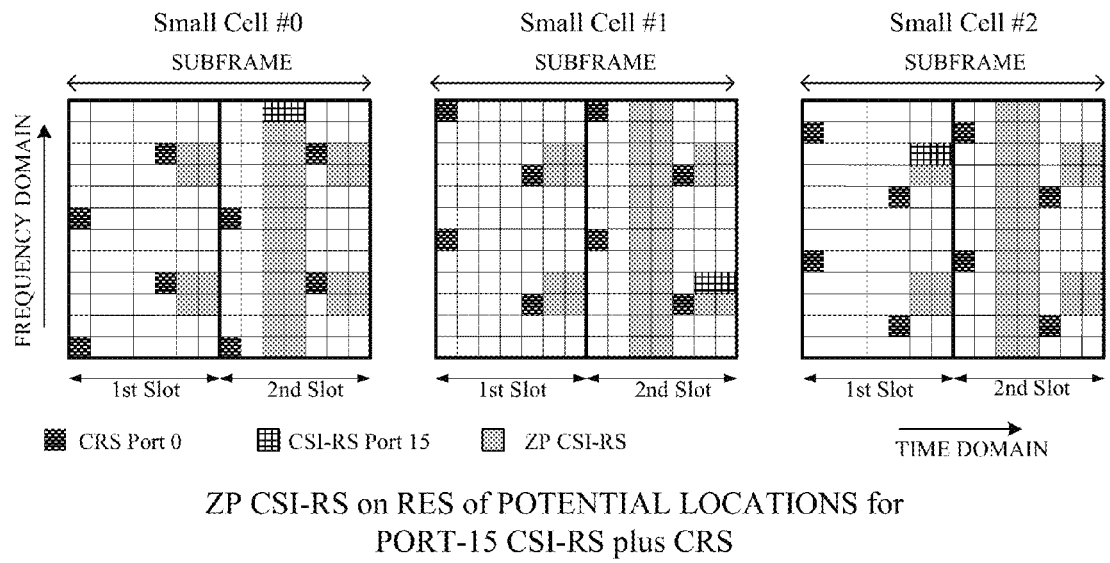
FIG. 10 illustrates a seventh embodiment of DRS design for small cell discovery and measurement.

FIG. 10 illustrates a seventh embodiment of DRS design for small cell discovery and measurement. In the embodiment of FIG. 10, antenna-port-0 CRS pilot pattern and antenna-port-15 CSI-RS pilot pattern in LTE system are reused for DRS transmission and RE muting can be applied to REs which are potential locations for CSI-RS transmission. To support RSRP and RSRQ measurements in one subframe, ZP CSI-RSs are applied on REs except those for CSI-RS transmission to eliminate the data interference to CSI-RS for RSRP measurement and OFDM symbols where CRS exists are used for RSSI measurement. In FIG. 10, except REs for CSI-RS transmission, ZP CSI-RSs are applied in the OFDM symbols where CSI-RS exists to avoid possible collision between data RE and CSI-RS in different cells. In this example, RSRP measurement can be conducted on CSI-RS in the $3^{rd}$ and $4^{th}$ OFDM symbols of the $2^{nd}$ slot for small cell #0, $6^{th}$ and $7^{th}$ OFDM symbol of the $2^{nd}$ slot for small cell #1, $6^{th}$ and $7^{th}$ OFDM symbols of the $1^{st}$ slot for small cell #2. Timing and frequency synchronization, cell detection and RSSI measurement for RSRQ calculation can be conducted on CRS in the $1^{st}$ and $5^{th}$ OFDM symbols of each slot.

Figure 11:
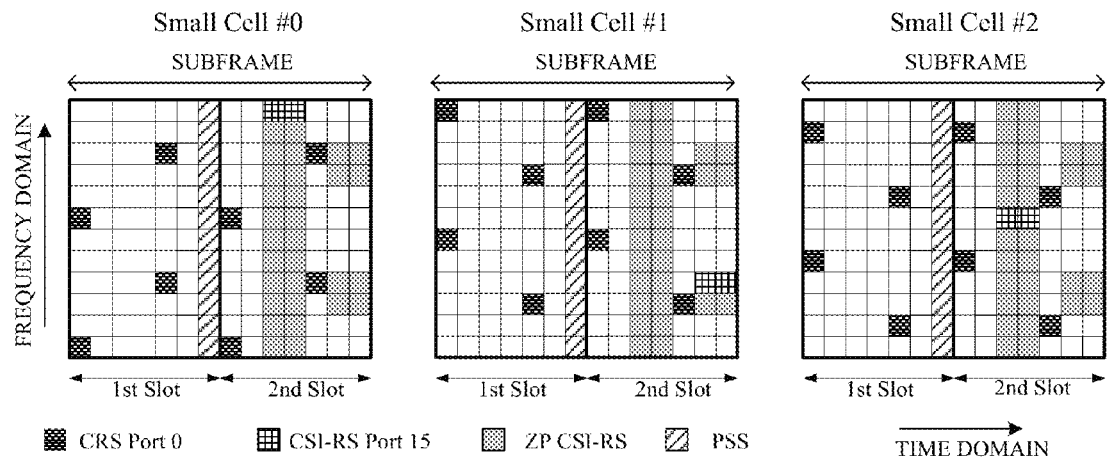
FIG. 11 illustrates an eighth embodiment of DRS design for small cell discovery and measurement.

FIG. 11 illustrates an eighth embodiment of DRS design for small cell discovery and measurement. In the embodiment of FIG. 11, PSS pilot pattern, antenna-port-0 CRS pilot pattern, and antenna-port-15 CSI-RS pilot pattern in LTE system are reused for DRS transmission and RE muting can be applied to REs which are potential locations for CSI-RS transmission. PSS is used for coarse timing and frequency synchronization. To support RSRP and RSRQ measurements in one subframe, ZP CSI-RSs are applied on REs except those for CSI-RS and PSS transmission to eliminate the data interference to CSI-RS for RSRP measurement and OFDM symbols where CRS exists are used for RSSI measurement. In FIG. 11, $7^{th}$ OFDM symbol of $1^{st}$ slot is reserved for PSS transmission and CSI-RS is only transmitted in the $2^{nd}$ slot. Except REs for CSI-RS transmission, ZP CSI-RSs are applied in the OFDM symbols where CSI-RS exists to avoid possible collision between data RE and CSI-RS in different cells. In this example, RSRP measurement can be conducted on CSI-RS in the $3^{rd}$, $4^{th}$ OFDM symbols of the $2^{nd}$ slot for small cell #0 and small cell #2, $6^{th}$, $7^{th}$ OFDM symbols of the $2^{nd}$ slot for small cell #1. Fine timing and frequency synchronization, cell detection, and RSSI measurement for RSRQ calculation can be conducted on CRS in the $1^{st}$ and $5^{th}$ OFDM symbols of each slot.

Figure 12:
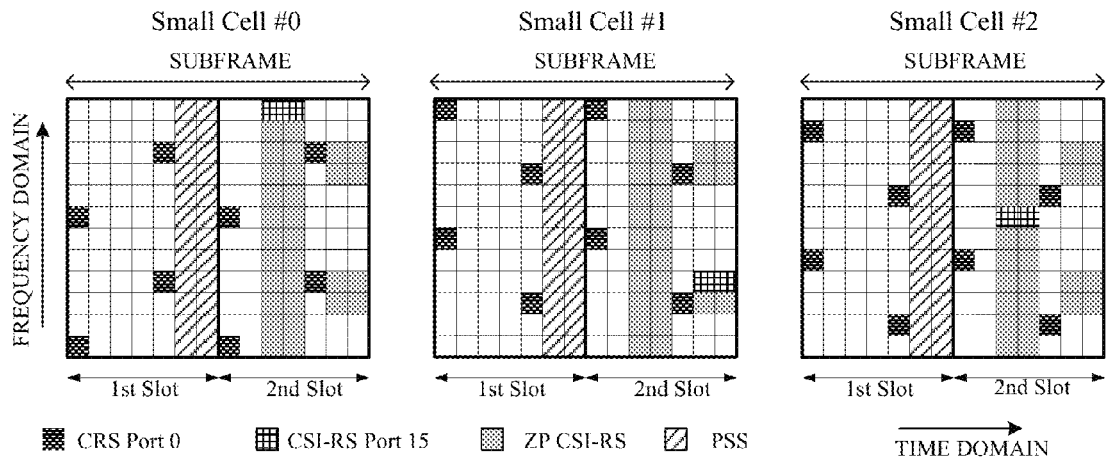
FIG. 12 illustrates a ninth embodiment of DRS design for small cell discovery and measurement.

FIG. 12 illustrates a ninth embodiment of DRS design for small cell discovery and measurement. In the embodiment of FIG. 12, PSS pilot pattern, antenna-port-0 CRS pilot pattern, and antenna-port-15 CSI-RS pilot pattern in LTE system are reused for DRS transmission and RE muting can be applied to REs which are potential locations for CSI-RS transmission. Two copies of a PSS sequence are used for better timing/frequency synchronization. To support RSRP and RSRQ measurements in one subframe, ZP CSI-RSs are applied on REs except those for CSI-RS and PSS transmission to eliminate the data interference to CSI-RS for RSRP measurement and OFDM symbols where CRS exists are used for RSSI measurement. In FIG. 12, the $6^{th}$ and $7^{th}$ OFDM symbols of $1^{st}$ slot are reserved for PSS transmission and CSI-RS is only transmitted in the $2^{nd}$ slot. Except REs for CSI-RS transmission, ZP CSI-RSs are applied in the OFDM symbols where CSI-RS exists to avoid possible collision between data RE and CSI-RS in different cells. In this example, RSRP measurement can be conducted on CSI-RS in the $3^{rd}$, $4^{th}$ OFDM symbols of the $2^{nd}$ slot for small cell #0 and small cell #2, $6^{th}$, $7^{th}$ OFDM symbols of the $2^{nd}$ slot for small cell #1. Fine timing and frequency synchronization, cell detection, and RSSI measurement for RSRQ calculation can be conducted on CRS in the $1^{st}$ and $5^{th}$ OFDM symbols of each slot.

Figure 13:
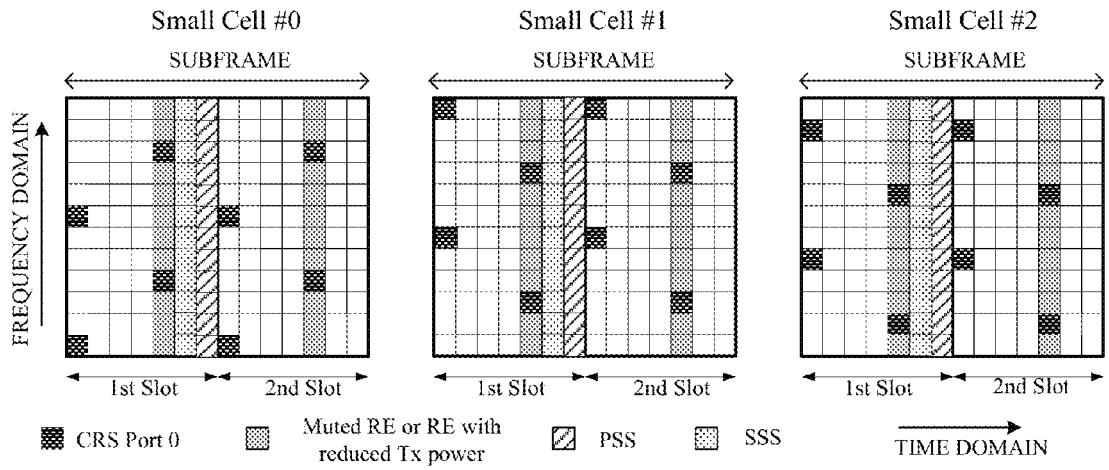
FIG. 13 illustrates a tenth embodiment of DRS design for small cell discovery and measurement.

FIG. 13 illustrates a tenth embodiment of DRS design for small cell discovery and measurement. In the embodiment of FIG. 13, PSS/SSS pilot pattern, antenna-port-0 CRS pilot pattern in LTE system is reused for DRS transmission and RE muting can be applied to REs that are potential locations for CRS transmission and are not used for CRS transmission. PSS is used for coarse timing and frequency synchronization. SSS is used for fine timing and frequency synchronization and cell ID detection. To support both RSRP and RSRQ measurements in one subframe, REs except those for CRS transmission in a subset of OFDM symbols where CRS exists are all muted to eliminate the data interference to CRS or transmitted with reduced power. In FIG. 13, the first OFDM symbol of each slot are excluded from RE muting and REs except those for actual CRS transmission in the $5^{th}$ OFDM symbol of each slot are all muted to avoid possible collision between data RE and CRS in different cells. In this example, RSRP measurement can be conducted on CRS in the $5^{th}$ OFDM symbol of each slot and RSSI measurement can be conducted on the first OFDM symbol of each slot for RSRQ calculation.

Figure 14:
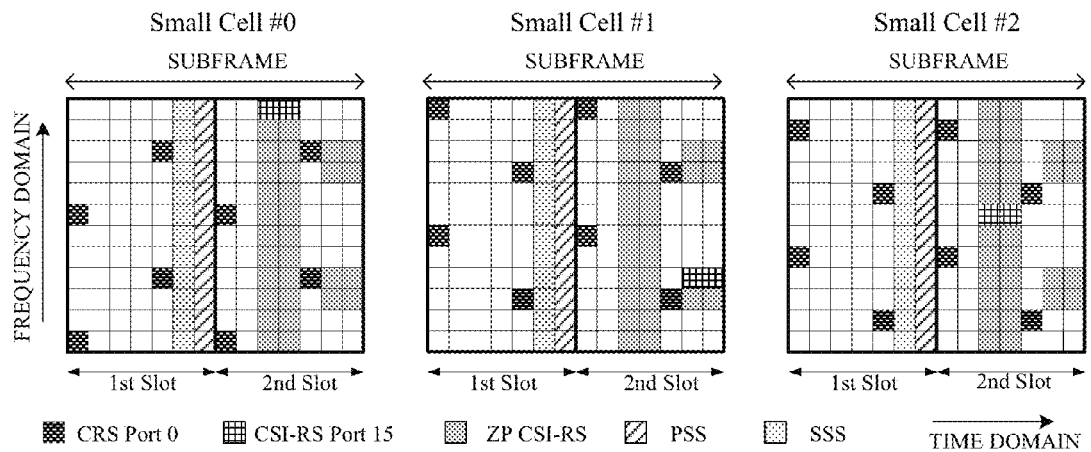
FIG. 14 illustrates an eleventh embodiment of DRS design for small cell discovery and measurement.

FIG. 14 illustrates an eleventh embodiment of DRS design for small cell discovery and measurement. In the embodiment of FIG. 14, PSS/SSS pilot pattern, antenna-port-0 CRS pilot pattern, and antenna-port-15 CSI-RS pilot pattern in LTE system are reused for DRS transmission and RE muting can be applied to REs which are potential locations for CSI-RS transmission. PSS is used for coarse timing and frequency synchronization. SSS is used for fine timing and frequency synchronization and cell ID detection.

A common method for coarse time/frequency synchronization and cell detection is to use PSS/SSS because the UE is able to access 6-PRB pair channel bandwidth only in the beginning. CRS is used for time/frequency tracking (fine synchronization) after obtaining MIB from PBCH. Since CRS sequence also depends on PCI, CRS can be used for cell detection as well if the UE is able to access full channel bandwidth. For example, under macrocell-assisted small cell discovery, the UE can obtain channel bandwidth information of the small cell from the macrocell. To support RSRP and RSRQ measurements in one subframe, ZP CSI-RSs are applied on REs except those for CSI-RS and PSS transmission to eliminate the data interference to CSI-RS for RSRP measurement and OFDM symbols where CRS exists are used for RSSI measurement. In FIG. 14, the $6^{th}$ and $7^{th}$ OFDM symbols of $1^{st}$ slot are reserved for PSS transmission and CSI-RS is only transmitted in the $2^{nd}$ slot. Except REs for CSI-RS transmission, ZP CSI-RSs are applied in the OFDM symbols where CSI-RS exists to avoid possible collision between data RE and CSI-RS in different cells. In this example, RSRP measurement can be conducted on CSI-RS in the $3^{rd}$, $4^{th}$ OFDM symbols of the $2^{nd}$ slot for small cell #0 and small cell #2, $6^{th}$, $7^{th}$ OFDM symbols of the $2^{nd}$ slot for small cell #1. Fine timing and frequency synchronization, cell detection, and RSSI measurement for RSRQ calculation can be conducted on CRS in the $1^{st}$ and $5^{th}$ OFDM symbols of each slot.

From the above embodiments, it can be seen that one DRS occasion consists of PSS/SSS/CRS+CSI-RS. The existence of CSI-RS is configurable. The duration of one DRS occasion is one to five DL subframes. Typically, PSS/SSS and CSI-RS exists in one of the multiple subframes, while SSS exists in the $1^{st}$ subframe. The subframe containing CSI-RS is configurable. CRS exists in every DL subframe in one DRS occasion.

Figure 15:
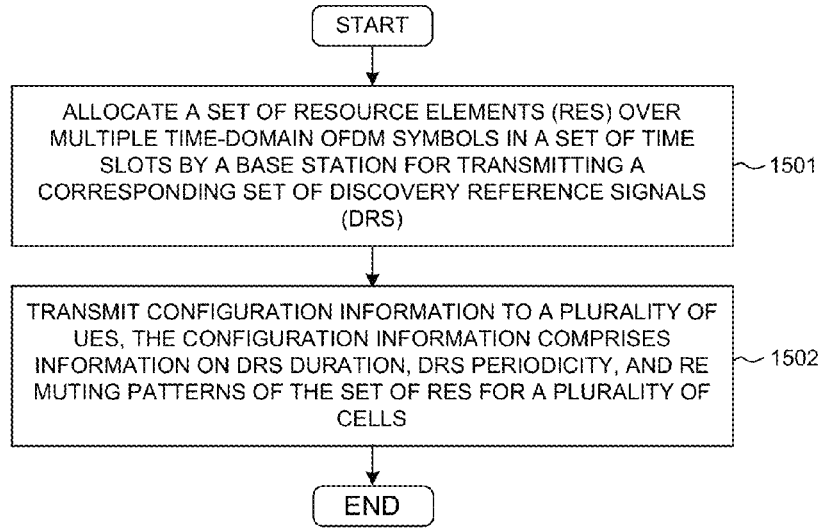
FIG. 15 is a flow chart of a method of resource allocation and configuration for DRS from eNB perspective in accordance with one novel aspect.

FIG. 15 is a flow chart of a method of resource allocation and configuration for DRS from eNB perspective in accordance with one novel aspect. In step 1501, a base station allocates a set of resource elements (REs) over multiple time-domain OFDM symbols in a set of time slots or subframes for transmitting a corresponding set of discovery reference signals (DRS) from a plurality of small cells. In step 1502, the base station transmits configuration information to a plurality of user equipments (UEs). The configuration information comprises information on DRS duration, DRS periodicity, and RE muting patterns of the set of REs for the plurality of small cells. In one embodiment, the DRS comprises at least one of a cell-specific reference signal (CRS), a channel state information reference signal (CSI-RS), a positioning reference signal (PRS), and a synchronization signal (PSS/SSS).

Figure 16:
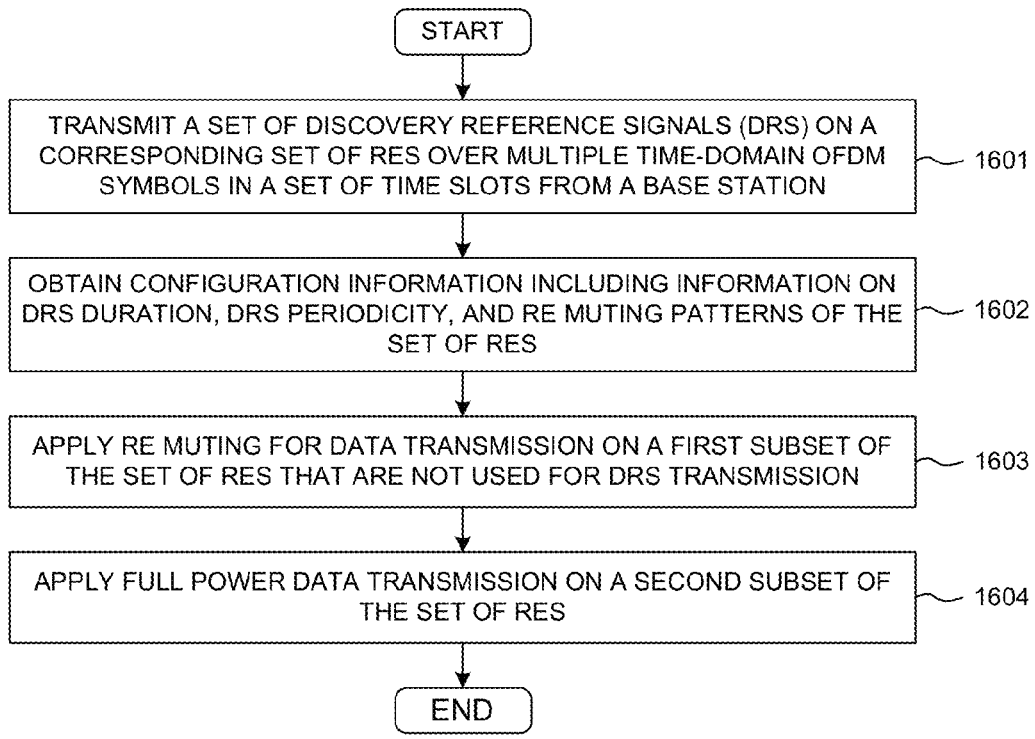
FIG. 16 is a flow chart of a method of small cell discover and measurement from eNB perspective in accordance with one novel aspect.

FIG. 16 is a flow chart of a method of small cell discover and measurement from eNB perspective in accordance with one novel aspect. In step 1601, a base station transmits a set of discovery reference signal (DRS) on a corresponding set of resource elements (REs) over multiple time-domain OFDM symbols in a set of time slots or subframes. In step 1602, the base station obtains DRS configuration information including DRS duration, DRS periodicity, and RE muting patterns of the set of REs. In step 1603, the base station applies RE muting for data transmission on a first subset of the set of REs that are not used for DRS transmission. In step 1604, the base station applies full power data transmission on a second subset of REs. The RE muting patterns may be determined based on cell loading, and no RE muting is applied in control channels or when collide with other legacy reference signals. The RE muting patterns may be received from another base station, or determined based on PCI. In one embodiment, the first subset of REs belongs to a first subset of the multiple time-domain OFDM symbols, and the second subset of REs belongs to a second subset of the multiple time-domain OFDM symbols.

Figure 17:
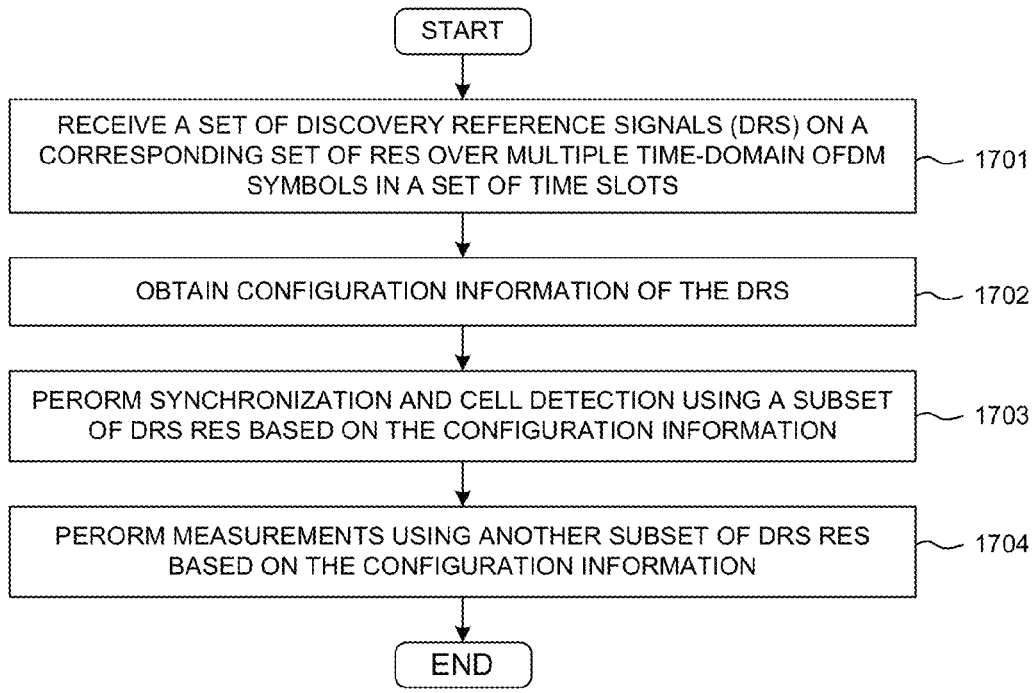
FIG. 17 is a flow chart of a method of small cell discover and measurement from UE perspective in accordance with one novel aspect.

FIG. 17 is a flow chart of a method of small cell discover and measurement from UE perspective in accordance with one novel aspect. In step 1701, a user equipment (UE) receives a set of discovery reference signals (DRS) on a corresponding set of resource elements (REs) over multiple time-domain OFDM symbols in a set of time slots. In step 1702, the UE obtains DRS configuration information. In step 1703, the UE performs synchronization and cell detection using a subset of DRS REs based on the configuration information. In step 1704, the UE performs measurements using another subset of DRS REs based on the configuration information. In one embodiment, the UE performs a first measurement on a first subset of time-domain OFDM symbols to obtain a first metric, and the UE performs a second measurement on a second subset of time domain OFDM symbols to obtain a second metric. The first metric is a Reference Signal Received Power (RSRP), and RE muting is applied on a subset of REs that are not used for DRS transmission in the first subset of time-domain OFDM symbols. The second metric is a Received Signal Strength Indicator (RSSI), and RE muting is not applied on REs in the second subset of time-domain OFDM symbols. In one embodiment, a DRS duration lasts one or more subframes, and the DRS is transmitted with a periodicity that is substantially longer than one radio frame. The UE performs synchronization, cell detection, and measurements within one single DRS duration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
    receiving, by a user equipment (UE), a set of discovery reference signals (DRS) that include at least one of a cell-specific reference signal (CRS), a channel state information reference signal (CSI-RS), a primary synchronization signal (PSS) and a secondary synchronization signal (SSS);
    obtaining configuration information from the DRS about a set of resource elements (REs) in multiple time-domain OFDM symbols, wherein the configuration information indicates whether RE muting has been applied to each of the REs, and wherein RE muting has been applied to a first subset of REs;
    performing synchronization and cell detection using the first subset of REs in a first subset of OFDM symbols based on the configuration information, wherein the synchronization is performed using the PSS and/or the SSS, and wherein the cell detection is performed using the CRS and/or the CSI-RS; and
    performing measurement of a first metric using a second subset of REs in a second subset of OFDM symbols based on the configuration information, wherein RE muting has not been applied to the second subset of REs.
2. The method of claim 1, wherein the first metric is a Received Signal Strength Indicator (RSSI).

3. The method of claim 2, further comprising:
performing measurement of a second metric using the first subset of REs in the first subset of OFDM symbols.

4. The method of claim 3, wherein the second metric is a Reference Signal Received Power (RSRP).

5. The method of claim 1, wherein RE muting is not applied on REs used for DRS transmission.

6. The method of claim 4, wherein the UE derives a Reference Signal Received Quality (RSRQ) for a target cell based on RSRP and RSSI of the target cell.

7. The method of claim 4, wherein the UE derives a signal to interference plus noise ratio (SINR) for a target cell based on RSRP, RSSI and a cell loading of the target cell.

8. The method of claim 1, wherein the synchronization is performed during one cycle of the DRS.

9. The method of claim 1, wherein a DRS duration lasts for one or more subframes, and wherein the DRS is transmitted with a periodicity that is substantially longer than one radio frame.

10. The method of claim 9, wherein the UE performs synchronization, cell detection, and measurements within one single DRS duration.

11. A method comprising:
receiving, by a user equipment (UE), a set of discovery reference signals (DRS) on a corresponding set of resource elements (REs) over multiple time-domain OFDM symbols in a set of time slots, wherein the discovery reference signals comprise a cell-specific reference signal (CRS), a channel state information reference signal (CSI-RS), a primary synchronization signal (PSS) and a secondary synchronization signal (SSS);
obtaining configuration information of the DRS, wherein the configuration information indicates whether RE muting has been applied to each of the DRS REs;
performing synchronization and cell detection using a subset of DRS REs based on the configuration information; and
performing measurements using another subset of DRS REs based on the configuration information, wherein the synchronization is performed on both the CRS and/or the CSI-RS and on the PSS and/or the SSS, and wherein the measurements for cell detection are performed on the CRS and/or the CSI-RS.

12. A User Equipment (UE), comprising:
a receiver that receives a set of discovery reference signals (DRS) that include at least one of a cell-specific reference signal (CRS), a channel state information reference signal (CSI-RS), a primary synchronization signal (PSS) and a secondary synchronization signal (SSS);
a configuration module that obtains configuration information from the DRS about a set of resource elements (REs) in multiple time-domain OFDM symbols indicating whether RE muting has been applied to each of the REs, wherein RE muting has been applied to a first subset of REs;
a synchronization module that performs synchronization and cell detection using the first subset of REs in a first subset of OFDM symbols based on the configuration information, wherein the synchronization is performed using the PSS and/or the SSS, and wherein the cell detection is performed using the CRS and/or the CSI-RS; and
a measurement module that performs measurement of a first metric using a second subset of REs in a second subset of OFDM symbols based on the configuration information, wherein RE muting has not been applied to the second subset of REs.

13. The UE of claim 12, wherein the first metric is a Received Signal Strength Indicator (RSSI).

14. The UE of claim 13, further comprising:
performing measurement of a second metric using the first subset of REs in the first subset of OFDM symbols.

15. The UE of claim 14, wherein the second metric is a Reference Signal Received Power (RSRP).

16. The UE of claim 12, wherein RE muting is not applied on REs used for DRS transmission.

17. The method of claim 15, wherein the UE derives a Reference Signal Received Quality (RSRQ) for a target cell based on RSRP and RSSI of the target cell.

18. The UE of claim 15, wherein the UE derives a signal to interference plus noise ratio (SINR) for a target cell based on RSRP, RSSI and a cell loading of the target cell.

19. The UE of claim 12, wherein the synchronization is performed during one cycle of the DRS.

20. The UE of claim 12, wherein a DRS duration lasts for one or more subframes, and wherein the DRS is transmitted with a periodicity that is substantially longer than one radio frame.

21. The UE of claim 20, wherein the UE performs synchronization, cell detection, and measurements within one single DRS duration.

22. A User Equipment (UE), comprising:
a receiver that receives a set of discovery reference signals (DRS) on a corresponding set of resource elements (REs) over multiple time-domain OFDM symbols in a set of time slots, wherein the discovery reference signals comprise a cell-specific reference signal (CRS), a channel state information reference signal (CSI-RS), a primary synchronization signal (PSS) and a secondary synchronization signal (SSS);
a configuration module that obtains configuration information of the DRS indicating whether RE muting has been applied to each of the DRS REs;
a synchronization module that performs synchronization and cell detection using a subset of DRS REs based on the configuration information; and
a measurement module that performs measurements using another subset of DRS REs based on the configuration information, wherein the synchronization is performed on both the CRS and/or the CSI-RS and on the PSS and/or the SSS, and wherein measurements for cell detection are performed on the CRS and/or the CSI-RS.

* * * * *